(12) United States Patent
Richmond et al.

(10) Patent No.: US 6,537,440 B1
(45) Date of Patent: Mar. 25, 2003

(54) PROCESSING COPPER SULPHIDE ORES

(76) Inventors: Geoffrey Richmond, 39 River Road, Burnie, Tasmania (AU); David B Dreisinger, 5233 Bentley Crescent, Delta, British Columbia (CA), V4K 4K2

( * ) Notice: Subject to any disclaimer, the term of this patent is extended or adjusted under 35 U.S.C. 154(b) by 0 days.

(21) Appl. No.: 09/744,422
(22) PCT Filed: Jul. 14, 1999
(86) PCT No.: PCT/AU99/00568
§ 371 (c)(1), (2), (4) Date: Jan. 23, 2001
(87) PCT Pub. No.: WO00/06784
PCT Pub. Date: Feb. 10, 2000

(30) Foreign Application Priority Data

Jul. 24, 1998 (AU) .............................................. PP 4844

(51) Int. Cl.[7] ............................. C25C 1/12; C25B 15/00; B01D 11/00
(52) U.S. Cl. ......................... 205/580; 205/581; 204/233; 423/27; 423/658.5
(58) Field of Search ................................. 205/580, 581; 423/27, 658.5; 204/233

(56) References Cited

U.S. PATENT DOCUMENTS

| | | |
|---|---|---|
| 4,431,613 A | 2/1984 | Verbaan |
| 5,431,788 A | 7/1995 | Jones |
| 5,698,170 A * | 12/1997 | King .................. 423/27 X |
| 5,730,766 A | 3/1998 | Collins et al. |
| 5,895,633 A * | 4/1999 | King .................. 423/27 X |

FOREIGN PATENT DOCUMENTS

| | | |
|---|---|---|
| CA | 2101514 | 1/1995 |
| WO | 9639550 | 12/1996 |
| WO | 9708349 | 3/1997 |

* cited by examiner

Primary Examiner—Donald R. Valentine
(74) Attorney, Agent, or Firm—Intellectual Property Law Group LLP; Otto O. Lee; Juneko C. Jackson

(57) ABSTRACT

A method for extracting copper from a mineral feed containing copper sulphide mineral 1, which involves crushing and blending the feed 2, 6, 10 followed by leaching of the feed in an autoclave 20. The conditions in the autoclave are controlled so that the presence of oxygen at superatmospheric oxygen pressure maintains the ratio of ferrous to ferric ions at a level so as to facilitate the leaching of copper from the feed. The leaching is carried out in the presence of acid which may be itself generated by oxidising conditions in the autoclave. Further leaching is carried out in a series of tanks 22, 24, 26 and 28 after which the solids are separated from solution in a series of steps including treatment in a hydroclassifier 30, a clarifier 32 and a polishing filter 38. Copper is extracted from the resultant leachant at a copper extraction station 44 with a final copper product 54 being retrieved in electrowin cells 52.

28 Claims, 1 Drawing Sheet

PROCESSING COPPER SULPHIDE ORES

FIELD OF THE INVENTION

This invention relates to processes for recovering copper from copper containing feeds.

BACKGROUND OF THE INVENTION

A number of alternative process routes exist for the treatment of copper ores, particularly ores in which the copper is present as copper sulphides such as chalcocite $Cu_2S$, covellite CuS, bornite $Cu_5FeS_4$ and enargite $Cu_3AsS_4$. These routes include in-situ leaching, heap leaching and agitated tank leaching. Each route can incorporate different methods of regenerating ferric ion, the principal leach agent—bacterial oxidation, gaseous oxygen oxidation or chemical oxidants. The choice of route is influenced by factors such as resource tonnage and grade, mineralogy of both copper minerals and gangue, climate and environmental considerations.

These alternative methods are discussed in more detail below:

In-Situ Leaching

This technique has major environmental draw backs because of the difficulty in containing the leach solutions within the ore zone. Other difficulties arise from variable permeability of the ore, inability to control the leach reaction and the high likelihood of quite low overall recoveries. In-situ leaching is generally only considered for high permeability, low grade material which cannot be processed by other means and for resources where the leaching agent is quickly neutralised by waste rock surrounding the ore zone.

Heap Leaching

Heap leaching is commonly used to treat chalcocite ores in Australia e.g. Mt Gordon, Girilambone, and in other properties worldwide. However the effectiveness of this technique is highly dependent on the nature of the ore being treated. For some ores using medium height heaps, long leach times would be required for moderate recoveries. The rate of leaching is less dependent on the actual mineral leach rate than on those factors which will promote or inhibit leaching—oxygen supply, heap permeability, liquor percolation and ore grade variability. Many heap leach mine sites, experience continuing difficulty in attaining satisfactory stability in these factors with the result that heap leach performance often falls well below expectations which seemed theoretically reasonable at the time of the performance of trial leach tests.

Furthermore, where the ore contains high levels of pyrite there is a likelihood of a reaction of pyrite with ferric ion leading to increased acid production and conditions unsuitable for bacterial leaching.

Agitated Tank Leaching

Agitated tank leaching has the potential to maximise recoveries under controlled leach conditions. Leach times for either ground ore or a concentrate can be reduced to several hours. Pyrite reactions can be monitored and parameters such as oxygen supply and temperature adjusted to ensure the reaction is controlled. The process involves leaching ground ore in the presence of an acidic leachant containing ferric ion. The ferric ion oxidises the copper to form soluble copper ions and is itself reduced to ferrous ions. The ferrous ion is then converted back to ferric ion for further copper mineral attack. The ferrous ion oxidation can occur by a number of methods. The leachant can be separated from the solids and ferric regenerated bacterially or by reaction with acid and finely dispersed oxygen (or air). Alternatively ferric can be regenerated directly in the slurry by injection of finely dispersed oxygen or air. This can occur in the leach tank or by removing a small stream and passing it through a side-stream air/oxygen injection device. The process can be closely controlled so that the scale up to a full size plant is well understood and accurate estimates of final recoveries and operating and capital costs can be made. However there is significant effort and expense involved in regenerating the leachant. Furthermore the rate of leaching can decrease as ferric ion is used up in the leaching step. With some minerals e.g. covellite and enargite the leach rate is more dependent on the Eh which is strongly influenced by the ferric/ferrous ratio. Highest leach recoveries are often obtained by having an elevated ferric/ferrous rates at the end of the leach. This is difficult to attain in an atmospheric leach as the rate of oxygen dispersion in the pulp is limited.

Thus there is a need for a process which is suitable for treatment of a range of copper ores which deals with the disadvantages of the conventional processes described above.

DISCLOSURE OF THE INVENTION

A method for extracting copper from a mineral feed containing copper sulphide mineral including the steps of:
(a) leaching the feed with an acidic solution containing ferrous and/or ferric ions at a temperature above ambient in the presence of oxygen at superatmospheric oxygen pressure to produce a leachant solution containing copper ions;
(b) selectively extracting copper ions from the leachant solution by solvent extraction to form an extract solution containing copper ions and an acidic raffinate containing ferrous, ferric and low levels of copper ions;
(c) recycling some of the raffinate to be included in the acidic solution of step (a); and
(d) recovering copper from the extract solution.

Suitably the feed does not include significant quantities of soluble or leachable chloride. It should include less than 5% by weight of chloride more preferably less than 1% by weight. The presence of significant quantities of chloride ions makes for a very aggressive environment and thus requires the use of expensive equipment. This in turn leads to increased costs. Hence the preference for feeds low in chloride. Similarly the acidic solution should be kept substantially free of chlorides.

The copper sulphide mineral may include chalcocite $Cu_2S$, covellite CuS, bornite $Cu_5FeS_4$ or enargite $Cu_3AsS_4$ and/or mixtures of two or more of these. The copper sulphide mineral may include iron mineralization. The iron mineralization may be pyrite. It may include 15% to 95% pyrite. The copper sulphide mineral may be from the Esperanza deposit in Australia. Esperanza ore typically contains about 70% pyrite in association with chalcocite. After mining dilution the ore will average 60% pyrite i.e. the feed to the autoclave will be 30% to 70% pyrite averaging 60%.

By comparison an ore concentrate from the Mammoth deposit in Australia, after flotation may typically contain about 30% by weight of pyrite. This concentrate is also suitable for treatment to recover copper by the process of this invention.

To facilitate more rapid leaching the feed may be ground. After grinding the majority of particles in the feed have a size generally less than 150 microns more preferably less than 100 microns. Preferably after grinding the feed will be 80% by weight passing 150 microns and more preferably 80% by weight passing 75 to 106 microns.

In step (a) the acidic solution will contain sulphuric acid. The sulphuric acid is suitably generated in-situ in step (a) by the oxidation of sulphides contained in the feed and by transfer via solvent extraction from electrowinning. Suitably the concentration of the acidic solution falls within the range 10 to 60 g/l $H_2SO_4$.

Ferric ions in step (a) may be generated in-situ by the leaching of iron in the feed to produce ferrous ions and by the oxidation of ferrous ions in the feed and recycled raffinate to ferric ions by oxygen. The ferric ions promote the dissolution of the copper minerals to produce copper ions (mostly divalent cupric ions $Cu^{2+}$) and in the process are themselves reduced to the ferrous $Fe^{2+}$ state. Thus the acidic solution will contain both ferric and ferrous ions. It is preferred that the ratio of ferric to ferrous is at least 1.0 and is more preferably in excess of 2.0 at the end of the autoclave stage. Suitably the concentration of iron in solution is maintained in the range 10 to 40 g/l during leaching.

Suitably the leaching step (a) is carried out at a temperature in the range 50° C. to 105° C., more preferably 65° C. to 95° C. The oxygen partial pressure used for carrying out step (a) is generally maintained in the range 1 to 10 Bar more suitably 2 to 7 Bar.

There may be more than one leaching step. Subsequent leaching steps may be carried out under similar conditions to step (a). Alternatively, one or more subsequent leaching steps may be carried out under normal atmospheric conditions. Where prior or subsequent steps are carried out under normal atmospheric conditions, it is important to ensure that there is sufficient excess ferric ion in solution from step (a) to continue substantial leaching. Under normal atmospheric conditions with air/oxygen sparging there is greatly reduced regeneration of ferric ion from ferrous ion. Generally speaking the leaching steps should result in at least 80% and more preferably 90% of all copper in the feed being extracted into the acid solution for leaching. The leaching in subsequent tanks is enhanced if waste oxygen gas from the autoclave step is sparged into these tanks.

The solvent extraction may be carried out in one or more steps. It may be carried out using an organic phase containing a specific copper ion extractant. The organic phase may include a diluent, usually a kerosene with 10–30% aromatic content and an elevated flash point. The diluent reduces the viscosity of the organic phase and enhances organic/aqueous phase separations. Extractants may include modified aldoximes or modified or unmodified aldoxime/ketoxime mixtures. The following summarises a range of contents of a number of possible reagents for solvent extraction.

Reagent 1
   aldoxime: 5-nonylsalicylaldoxime
   Modifier: 2,2,4-trimethyl-1,3-pentanediol diisobutyrate & high flash point diluent Reagent 2
   ketoxime: 2-hydroxy-5nonylacetophenone oxime
   aldoxime: 5-nonylsalicylaldoxime
   Modifier: Tridecanol & high flash point diluent Reagent 3
   aldoxime: 5-nonylsalicylaldoxime
   Modifier: Tridecanol & high flash diluent Reagent 4
   ketoxime: 2-hydroxy-5nonylacetophenone oxime
   aldoxime: 5-nonylsalicylaldoxime & high flash point diluent Reagent 5
   aldoxime: 5-nonylsalicylaldoxime
   Modifier: Tridecanol & high flash point diluent The pregnant liquor solution from leaching may typically contain 15 to 30 or 40 grams/litre of copper. About 25 g/l of copper is particularly appropriate. After contact with the organic phase in solvent extraction the depleted copper solution or raffinate will contain about 2–4 g/l copper. There is no need to reduce the copper tenor of this stream to lower levels as the majority or all of the raffinate is recycled to the head of the leach. The presence of copper in the recycle stream can also catalyse the regeneration of ferrous to ferric ions in the leach.

The loaded organic resulting from solvent extraction may be stripped of copper by contacting it with high strength acid (e.g. 180 g/l sulphuric acid) to produce an electrolyte stream. The electrolyte stream may be fed to an electrowin circuit to recover copper.

Spent electrolyte may then be recycled to recover more copper.

In a typical process for carrying out the invention, after leaching in an autoclave and following further leaching and cooling, the leached slurry may be discharged to a hydroclassifier. Typically no flocculent is added to the hydroclassifier. Underflow solids from the hydroclassifier may reach a final settled density of 55–65% solids. The underflow solids are passed to a storage tank before flocculation and filtration on a horizontal belt filter. The filter cake may be washed in three stages counter-currently on the residue filter belt. This removes copper present in the residual moisture of the filter cake.

The overflow from the hydroclassifier contains fine solids that did not settle in the hydroclassifier. It is preferred that some solids, typically 5,000–100,000 ppm, be contained in the hydroclassifier overflow.

Removal of the fine solids from the feed to the leach residue horizontal belt filter greatly increases the filtration rate of residue solids and allows for improved wash efficiency. A removal of about 3% of the solids by weight in the hydroclassifier overflow allows a substantial improvement in the filtration rate on the horizontal belt filter.

The presence of fine solids in the hydroclassifier overflow also improves the coagulation/flocculation properties of this stream. This allows sufficiently large flocs to be formed which can then be satisfactorily removed in the clarifier.

The hydroclassifier can be fitted with recycle of hydroclassifier overflow back to the hydroclassifier and increase the proportion of fine solids reporting to the overflow.

Correct selection of coagulants/flocculants for treatment of the fine solids in the hydroclassifier overflow can ensure almost total removal of fine solids from the pregnant liquor stream. Any fine solids present in the pregnant liquor stream can cause disruption in the subsequent solvent extraction stage by the formation of stable emulsions known as crud.

The coagulated and flocculated fine solids can be removed in a clarifier known as a pinned bed clarifier. The coagulated and flocculated solids are introduced to the clarifier through a centre feed-well. Large flocs settle to the bottom of the clarifier and are discharged through a bottom outlet. Any fine remaining solids can be carried upwards through a bed of fine polystryene beads about 1 mm in diameter. These beads can be held in place or "pinned" by retaining means such as a retaining wedge wire screen. The bed of beads may be about 600 mm deep. The fine flocs are trapped on the beads and form a flocculated bed which can capture further fines carried up to the beads. The clarified liquor passes through the beads and screen and may be discharged to sand filters for final polishing before solvent extraction. Periodically liquor may be removed from the clarifier via a valve. This may be located near the base of the clarifier. This creates a back-flow through the bed and removes solids build-up. These solids can then be discharged through the bottom outlet.

The flocculated fine solids discharging from the bottom of the pinned bed clarifier may be further treated in a multistage counter current decantation (CCD) circuit. Wash water can be added to this circuit to wash soluble copper away from the near barren fine solids. Liquor discharging from this circuit can be further treated in a two stage extraction "bleed" solvent extraction circuit to remove copper to low levels. The "bleed" solvent extraction circuit can use barren organic diverted from the main solvent extraction circuit. Raffinate from the "bleed" solvent extraction circuit is combined with the washed CCD underflow solids and filter cake from the residue filter belt for neutralisation prior to disposal in the tailings dam.

Alternatively the fine solids discharging from the pinned bed clarifier underflow can be added to the hydroclassifier underflow solids and the combined stream filtered on the residue belt filter. Whilst the removal of fines from the hydroclassifier underflow greatly increases the filtration capacity of this stream there is little or no adverse impact on the filtration rate if those fines are correctly coagulated and flocculated and remixed with the coarse fraction. This method does not require a CCD circuit for the washing of the fine solids. Any required bleed from this circuit can be taken from the solvent extraction raffinate before final copper scavenging, neutralisation and disposal.

The applicant's process has a number of advantages over the prior art. For instance, by being carried out in reaction vessels such as an autoclave it does not have the environmental problems associated with in-situ leaching. The extractive processes can also be more carefully controlled in reaction vessels than in in-situ processes not employing reaction vessels. Furthermore it does have the significant advantage that it involves in-situ generation of ferric ion in the reaction vessel. This avoids the need for a separate ferric ion regeneration step and also makes it possible to generate sufficient ferric ion in the first leaching step as to promote downstream leaching with the excess ferric ion generated in the first step. This avoids the need for a separate and costly step to regenerate ferric ion downstream while at the same time making use of the excess heat generated in the first step to promote downstream leaching reactions.

A preferred embodiment of the present invention will now be described with reference to the accompanying drawing.

DETAILED DESCRIPTION OF THE PREFERRED EMBODIMENT

Figure 1:
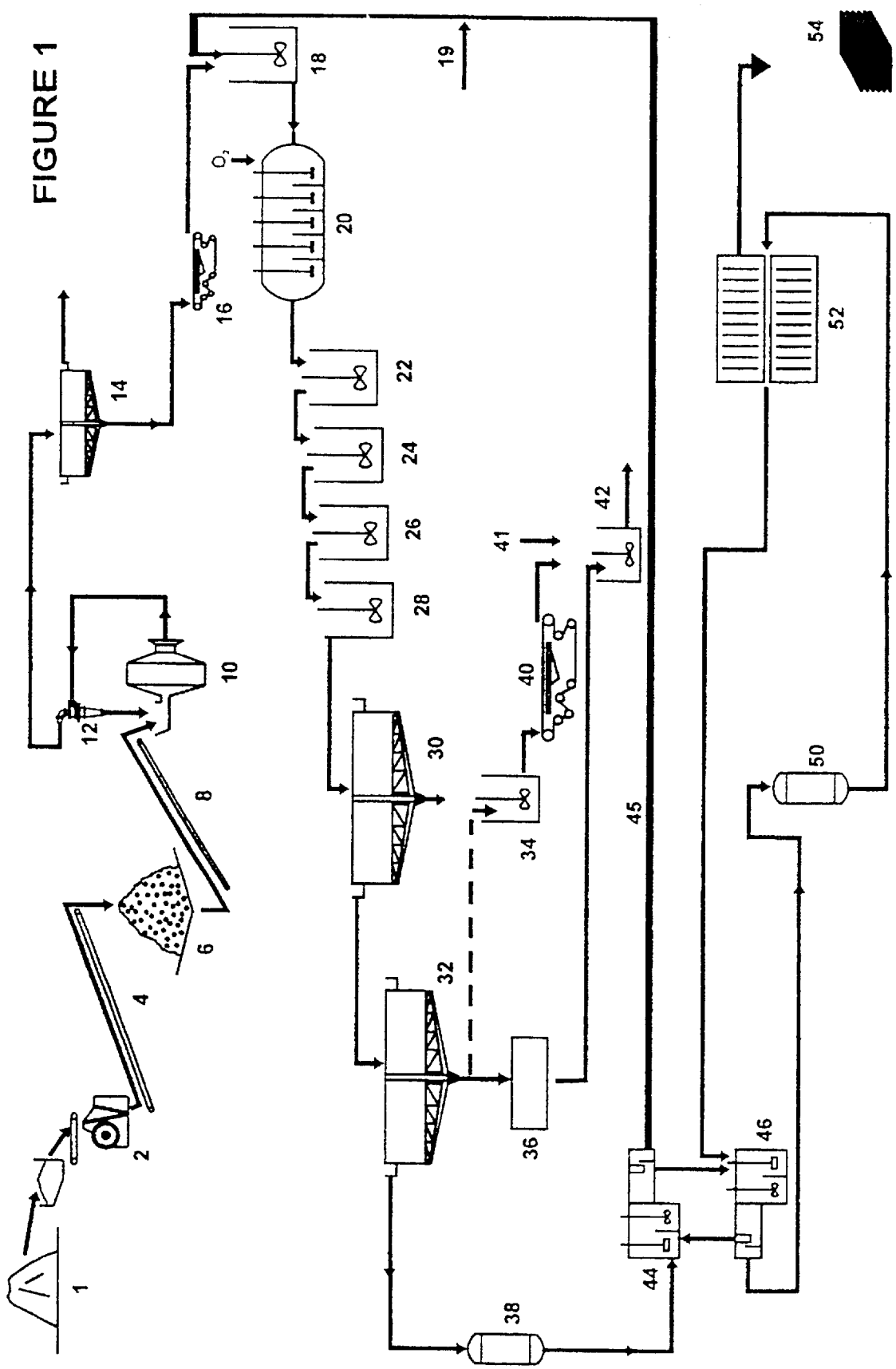
FIG. 1 shows a flow chart of a preferred process for operating the invention for the treatment of copper ores especially from the Esperanza ore deposit.

Referring to FIG. 1, run of mine ore 1 containing chalcocite and pyrite is stockpiled on an area adjacent to the primary crusher 2. Ore is blended from graded stockpiles to minimize feed grade fluctuations.

The ore will be jaw crushed to a particle size of about 150 mm and then conveyed by the conveyor 4 to a stockpile 6 of 2–3 days live capacity. The surge capacity of the stockpile allows for efficient intermittent crushing.

The grinding circuit fed from the stockpile 6 by the conveyor 8 comprises a single stage semi-autogenous grinding (SAG) mill 10 in closed circuit with cyclones 12. The mill has a variable speed drive to accommodate variable throughput rates which will arise from variable ore grades. Any harder ore or dilution can be accommodated by increasing the mill speed or by adding grinding media. A jaw crusher/single stage SAG mill circuit is preferred for simplicity and the ability to handle a wide range of ore conditions and feed rates.

Ground limestone or hydrated lime or quicklime is added to the mill feed as required to neutralize any acidity resulting from copper or pyrite oxidation in order to minimize corrosion in the mill.

The size of ore from the SAG mill circuit will generally be of the order of 80% passing 75 microns. This grind size is not crucial for effective leaching and will be coarsened whenever appropriate depending on the nature of the ore, to facilitate subsequent thickening and filtration operations.

The ground ore is then thickened by the thickener 14 and filtered by the belt filter 16 with the filtrate recycled as process water.

The filter cake is repulped in a tank 18 with raffinate which has been preheated utilizing waste heat 19 extracted from the atmospheric leach tanks 22 and 24. The raffinate typically contains about 30 g/l Fe and about 45 g/l sulphuric acid generated by the oxidation of sulphides and by transfer from electrowin via solvent extraction. The leach mixture is then pumped to an agitated low pressure autoclave 20 for copper leaching by the ferric sulphate route. The oxygen partial pressure is maintained at 2 to 5 Bar (total pressure 5–8 Bar) and the slurry temperature in the autoclave will reach 80 to 95° C. The amount of $Fe^{3+}$ required for copper dissolution will be regenerated in-situ through the conversion of $Fe^{2+}$ to $Fe^{3+}$ in the presence of acid and oxygen. The autoclave discharge at up to 95° C. gravitates to an agitated leach tank 22 for further copper dissolution at about 80° C. The slurry then flows through a series of cooling tanks 24, 26 and 28 to reduce the temperature to 40° C. while further leaching takes place. Cooling is provided by water reticulated through a cooling tower system (not shown).

The residence time for leaching in the autoclave for about 85–90% copper dissolution is about 1 hour and the overall time for leaching and cooling is about 2 to 5 hours.

The cooled leached slurry containing from 10% to 40% by weight of solids is then thickened in the hydroclassifier 30 to remove the solids as residue. The residue is bled from the bottom of the hydroclassifier and flocculated in the mixer 34 before being dewatered by the filter 40. Liquids from the dewatering may be returned to be joined with the pregnant leach solution emanating from the hydroclassifier 30.

The dewatered residue is then mixed in the mixer 42 with water and fine residue from the clarifier 32 after it has been washed in a counter current decantation circuit (CCD) 36 and is neutralized with limestone and hydrated lime before being dumped in a tailings dam for storage.

Pregnant leach solution (PLS) from the hydroclassifier 30 still containing some solids (typically 20,000–30,000 parts per million (ppm)) is flocculated in a stirred tank (not shown) and subjected to a further solid removal step in the clarifier 32 which may be a pinned bed clarifier.

This leaves the PLS with a solids content typically about 20 to 30 ppm

Polishing filters 38 then reduce the solids content to about 10 to 15 ppm.

Removal of copper from the filtered PLS typically containing about 25 grams/liter copper occurs at the solvent extraction plant 44.

Extraction takes place in mixer/settler tanks where the PLS comes into contact with a lean organic containing 30% extractant (Acorga M5640) and 70% diluent (Shellsol 2046, a kerosene) to allow the copper in the PLS to be loaded onto the organic phase. Two extraction stages are required to obtain sufficient extraction efficiency. The raffinate 45 from the extraction stage flows to a transfer tank (not shown) from where it is recycled back to the leach circuit and is heated for reuse. It is necessary to keep the leach and solvent extraction circuits in balance with respect to water, total Fe, impurity elements and acid concentration. This is achieved by bleeding off a controlled volume (approx. 5% of the total circuit volume/day) of the PLS as part of the clarifier underflow. The underflow is treated in a three stage counter current decantation circuit (CCD) 36 using fresh or waste water for washing. Solution produced in the CCD circuit is filtered and the copper is extracted in a two stage solvent extraction circuit using organic diverted from the main SX plant. Limestone can be added to the CCD circuit to reduce free acid and to improve the efficiency of the subsequent solvent extraction.

The raffinate from the bleed SX and washed solids from the CCD circuit are neutralized with limestone and hydrated lime before being discarded to the tailings dam.

Alternatively, the raffinate from the bleed SX can be treated to recover cobalt.

In another alternative arrangement the fine solids from the underflow is shown in the dotted lines in the drawing may be combined with the residue from the bottom of the hydroclassifier in the mixer 34.

The loaded organic phase is stripped of copper in the tank 46 by contacting it with high strength acid to produce a rich electrolyte solution (RES). The acid is obtained by recycling acid electrolyte and is produced during electrowinning as shown by the equation below:

$$2Cu^{2+}+2H_2O \square 2Cu+4H^++O_2$$

After treatment by filtering in the dual media filter 50 the cleaned RES is directed to the electrowin cells 52 where copper 54 is recovered and the spent acid electrolyte is recycled.

Experimental Example

The leach process has been evaluated by performing a large number of bench leach tests, batch pressure leach tests, continuous pressure leach tests and continuous pilot plant pressure leaching. The test ore samples were from a series of steep drill holes through the central and thickest part of the Esperanza orebody, from a horizontal drill hole across the orebody, and the bulk ore sample from the decline. A number of other drill hole samples representing the extremes of the orebody have also been tested.

Typical composition of the ore body is shown in Table A below.

TABLE A

| Mineral Component | Weight Percentage |
|---|---|
| Chalcocite | 10% |
| Pyrite | 70% |
| Enargite | <1% |

TABLE A-continued

| Mineral Component | Weight Percentage |
|---|---|
| Bornite | <1% |
| Covellite | <1% |
| Quartz | 5% |
| Silicates | 10% |

A leach pilot plant was operated at a throughput rate of 100–200 kg/hr (10–20kg Cu/hr). The circuit included repulping the ore in hot raffinate, leaching in a pressure vessel at 90° C. for one hour, further leaching in two atmospheric pressure agitated leach tanks, thickening, filtration of the thickened leach residue, clarification of the thickener overflow in a clarifier and sand filter, and solvent extraction of the copper from the clarified leach liquor. This pilot plant allowed for monitoring the effects of a closed leach circuit and the impact of process upsets and ore grade changes on the liquid/solids separation and solvent extraction circuits. Leach recoveries in the pilot plant were generally 88% to 90% and were limited by the 2.5 bar pressure rating of the autoclave.

The principal conclusions from these tests were:

- total recoveries in excess of 90% were generally achieved, although deeper ores require longer times and higher ferric ion concentrations to achieve these recoveries;
- the copper leaches in two stages with the first stage (conversion of $Cu_2S$, chalcocite, to $CuS+Cu^{2+}$) proceeding rapidly and the second stage (CuS to $Cu^{2+}+$ Sulphur) proceeding more slowly;
- acid in excess of 5 grams/litres in the PLS ensured that the leach products ($CuSO_4$, $Fe^{2+}$, $Fe^{3+}$) remained in solution;
- a near stoichiometric amount of $Fe^{3+}$(i.e. the amount predicted from the reaction chemistry) was required to complete the reaction;
- temperatures of 80° C. to 95° C. gave good recoveries while temperatures below 60° C. gave poor recoveries;
- grind size of feed did not affect leach recovery below a 80% passing size of 150 microns,
- the high levels of pyrite in Esperanza enhanced copper leaching; and
- an acceptable clean solution is required from the clarifier and polishing filter to avoid SX upsets due to crud formation.
- A key element in the leach is the regeneration of ferric ion from ferrous ion using oxygen, to allow continued leaching. Evaluation of $Fe^{2+}$to $Fe^{3+}$conversion using injected oxygen and an autoclave showed that autoclaving gave good conversion at 2–5 Bar (30–70 psi) oxygen pressure.

Batch autoclave test work was also carried out to determine copper leach recovery at various temperatures and oxygen pressures. The results indicated leach recoveries of 92% to 94% at 90° C. and 2 Bar oxygen pressure.

The estimated copper extractions from the various stages are:

| Stage | Average | High % | Low % |
| --- | --- | --- | --- |
| Leaching | 92 | 96 | 88 |
| Residue Washing | 99 | 99.5 | 98 |
| Overall Recovery | 91 | 95 | 87 |

*The overall recovery is leach recovery x residue wash recovery.

Whilst it has been convenient to describe the invention herein in relation to particularly preferred embodiments, it is to be appreciated that other constructions and arrangements are also considered as falling within the scope of the invention. Various modifications, alterations, variations and/or additions to the constructions and arrangements described herein are also considered as falling within the scope and ambit of the present invention.

What is claimed is:

1. A method for extracting copper from a mineral feed containing copper sulphide mineral comprising the steps of:
   (a) leaching the feed with an acidic solution containing ferrous and ferric ions at a temperature above ambient in the presence of oxygen at superatmospheric oxygen pressure to produce a leachant solution containing copper ions;
   (b) maintaining a level of iron in the leachant solution in the range 10 to 40 g/l during leaching at superatmospheric oxygen pressure;
   (c) selectively extracting copper ions from the leachant solution by solvent extraction to form an extract solution containing copper ions and an acidic raffinate containing ferrous, ferric and low levels of copper ions;
   (d) recycling some of the raffinate to be included in the acidic solution of step (a); and
   (e) recovering copper from the extract solution;
      wherein there is no substantial dilution of said leachant solution produced at step (a), prior to copper ion extraction from said leachant solution at step (c).

2. A method according to claim 1 wherein the feed contains less than 5% by weight of soluble or leachable chloride.

3. A method according to claim 1 wherein the feed contains less than 1% by weight of soluble or leachable chloride.

4. A method according to claim 1 wherein the copper sulphide mineral includes chalcocite $Cu_2S$, covellite CuS, bornite $Cu_5FeS_4$ or enargite $Cu_3AsS_4$, iron mineralization or mixtures of two or more of these.

5. A method according to claim 4 wherein the iron mineralization is in a form of pyrite.

6. A method according to claim 5 wherein the feed includes 30% to 70% pyrite.

7. A method according to claim 1 wherein the feed is ground prior to leaching so that a majority of particles in the feed have a size generally less than 150 microns.

8. A method according to claim 1 wherein 80% by weight of the feed can pass a 150 micron screen.

9. A method according to claim 1 wherein the acidic solution contains 10 to 60 g/l sulphuric acid.

10. A method according to claim 9 wherein leaching of feed is carried out in an autoclave maintained at an oxygen partial pressure in the range 2 to 7 Bar and the ferric to ferrous ratio is in excess of 2.0 when the step of leaching in the autoclave has been completed.

11. A method according to claim 10 wherein the leaching step (a) is carried out at a temperature in the range 50° C. to 105° C.

12. A method according to claim 1, wherein leaching of the feed is carried out in an autoclave maintained at an oxygen partial pressure in the range 1 to 10 Bar, and the ratio of ferric ion to ferrous ion is at least 1.0 when the step of leaching in the autoclave has been completed.

13. A method according to claim 1 wherein the leaching step (a) is carried out for long enough to ensure that at least 80% of all copper in the feed is extracted into the leachant solution.

14. A method according to claim 13 wherein the leaching step includes leaching in an autoclave followed by leaching in one or more leaching tanks at atmospheric pressure.

15. A method according to claim 14 wherein waste oxygen gas from the autoclave is sparged into the leaching tanks.

16. A method according to claim 1 wherein the solvent extraction step (b) is carried out using an organic phase containing a specific copper ion extractant.

17. A method according to claim 16 wherein the organic phase includes a kerosene diluent with 10% to 30% aromatic content.

18. A method according to claim 16 wherein the specific copper ion extractant includes a modified aldoxime or a modified or unmodified aldoxime/ketoxime mixture.

19. A method according to claim 18 wherein the aldoxime is 5-nonylsalicylaldoxime.

20. Copper produced in accordance with the method of claim 19.

21. A method according to claim 18 wherein the ketoxime is 2-hydroxy-5-nonylacetophenone oxime.

22. A method according to claim 18 wherein the extractant includes tridecanol modifier.

23. A method according to claim 16 wherein a pregnant liquor solution obtained by operating extraction step (c) contains in excess of 15 grams/liter of copper.

24. A method according to claim 21 wherein the copper is extracted from the pregnant liquor solution using a high strength acid and the resulting raffinate is recycled for use in step (b).

25. A method according to claim 1 further comprising a solids removal step prior to step (b), wherein the leachant solution is subjected to the solids removal step.

26. A method according to claim 1 wherein the copper is recovered in step (d) by electrowinning.

27. A method according to claim 1 wherein leaching of feed is carried out in an autoclave maintained at an oxygen partial pressure in the range 1 to 10 Bar, and the ratio of ferric ion to ferrous ion is at least 0.1 when the leaching in the autoclave step is completed.

28. An apparatus for extracting copper from a mineral feed containing copper sulphide mineral comprising:
   (a) comminution means for comminuting a mineral feed containing copper sulphide mineral such that 80% by weight of the feed can pass a 150 micron screen;
   (b) autoclave means for leaching the comminuted feed in an acidic solution under superatmospheric oxygen pressure while maintaining a level of iron in solution in the range 10 to 40 g/l;
   (c) leaching means, additional to the autoclave means, for promoting further leaching of the comminuted feed and to produce a leachant solution containing solids;

(d) separation means for separating the leachant solution from the solids;
(e) solvent extraction means for extracting copper into a solvent from the leachant solution; and
(f) recovery means including an electrowinning station for recovery of solid copper from the solvent.

* * * * *

UNITED STATES PATENT AND TRADEMARK OFFICE
CERTIFICATE OF CORRECTION

PATENT NO. : 6,537,440 B1  Page 1 of 1
DATED : March 25, 2003
INVENTOR(S) : Richmond et al.

It is certified that error appears in the above-identified patent and that said Letters Patent is hereby corrected as shown below:

<u>Title page,</u>
Insert Item [73], Assignee: -- [73] Assignee: Western Metals Copper Limited, Burnie, Tasmania (AU) --

Signed and Sealed this

Nineteenth Day of August, 2003

JAMES E. ROGAN
*Director of the United States Patent and Trademark Office*